March 15, 1927.  
E. VOGEL  
1,621,142
DIFFERENTIAL PISTON PUMP
Filed Nov. 24, 1925
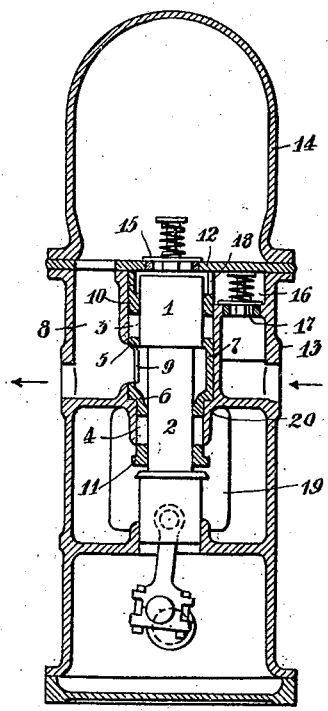
Ernest Vogel
INVENTOR
By: Marks & Clerk
Attys Patented Mar. 15, 1927.

1,621,142

UNITED STATES PATENT OFFICE.

ERNST VOGEL, OF STOCKERAU, NEAR VIENNA, AUSTRIA.

DIFFERENTIAL PISTON PUMP.

Application filed November 24, 1925, Serial No. 71,187, and in Austria December 24, 1924.

In the known kinds of differential piston pumps three stuffing boxes are provided for the differential piston, which all lie outside and are tightened separately. If internal stuffing boxes are also used, they are difficult or impossible to tighten and cannot be inspected. Hence they soon become leaky, thus causing losses in the quantity delivered and in the differential action of the piston.

According to the present invention these drawbacks are overcome by only two stuffing boxes being provided for the differential piston, the supporting rings of which facing one another act on one another, so that by tightening a single externally accessible gland both stuffing boxes can be tightened.

In the example of a vertical pump shown in vertical section in the accompanying drawing the differential piston 1, 2 is only provided with two stuffing boxes 3 and 4, the neck rings 5 and 6 of which act on one another, for instance by being connected together to form a single sleeve 7 which is provided with a port 9 leading to the delivery space 8. The stuffing boxes are completed by the neck ring 10 of the packing 3 and the externally accessible gland 11. The neck ring 10 abuts against an end plate 12, which is for instance interposed between the casing 13 and the air vessel 14 and supports the delivery valve 15. This neck ring is provided with an opening at 18 giving into the suction space 16 and the suction valve 17. The gland 11 is accessible through a closing member 19 (a door) for the purpose of tightening it in the usual manner.

Owing to this arrangement by operating the gland 11 both packings 3, 4 can be tightened. Owing to the transmission of the pressure by the sleeve 7 this tightening will be fairly uniform at both stuffing boxes. After the removal of the air vessel 14 and the plate 12 the neck ring and the inner packing 3 are readily accessible, as is also the suction valve 17. As in the constructional form shown in the drawing one of the neck rings 5, 6 for example the neck ring 6 abuts against a shoulder 20 of the casing for withstanding a pressure acting in the direction towards the gland 11, the inner packing 3 can be inserted without regard to the packing 4 and can be tightened by replacing the parts 10, 12, 14 in position. Any further tightening can be effected when the packing 4 is tightened by means of the gland 11, it being only necessary to open the door 19. The operation of the pump is well known, viz, that only one stroke is a suction stroke, but both strokes are delivery strokes.

What I claim is:

1. A pump of the character described comprising in combination a cylinder, a differential piston operating therein, two stuffing boxes one for each part of the differential piston, neck rings capable of acting on one another between the said stuffing boxes, and a single gland for the two stuffing boxes, capable of being tightened from the outside.

2. A pump of the character described comprising in combination a cylinder, a differential piston operating therein, two stuffing boxes one for each part of the differential piston two neck rings between the said stuffing boxes, a sleeve connecting the two neck rings, a port in the said sleeve and a single gland for the two stuffing boxes capable of being tightened from the outside.

3. A pump of the character described comprising in combination a cylinder, a differential piston operating therein, two stuffing boxes one for each part of the differential piston, neck rings capable of acting on one another between the said stuffing boxes, a single gland for the two stuffing boxes capable of being tightened from the outside, an air vessel at one end of the pump, a plate between the air vessel and the pump and constituting a support for the neck ring of one of the stuffing boxes, such that the latter stuffing box becomes accessible when the said plate and air vessel have been removed.

4. A differential piston pump as claimed in claim 1 and having an abutment on the pump for the neck ring of one stuffing box for withstanding a pressure acting in the direction towards the gland, for the purpose of enabling the inner stuffing box to be tightened by means of the said plate.

In witness whereof I have hereunto signed my name.

ERNST VOGEL.